US012451539B2

(12) United States Patent
Hong et al.

(10) Patent No.: US 12,451,539 B2
(45) Date of Patent: Oct. 21, 2025

(54) BATTERY PACK COOLING STRUCTURE THROUGH APPLYING VARIABLE THICKNESS OF GAP FILLER

(71) Applicant: SEOYON E-HWA CO., LTD., Anyang (KR)

(72) Inventors: Seok Hwan Hong, Anyang (KR); Sung Su Kim, Suwon (KR)

(73) Assignee: SEOYON E-HWA CO., LTD., Anyang (KR)

( * ) Notice: Subject to any disclaimer, the term of this patent is extended or adjusted under 35 U.S.C. 154(b) by 531 days.

(21) Appl. No.: 18/048,443

(22) Filed: Oct. 21, 2022

(65) Prior Publication Data

US 2023/0261279 A1 Aug. 17, 2023

(30) Foreign Application Priority Data

Feb. 17, 2022 (KR) .................. 10-2022-0020503

(51) Int. Cl.
 *H01M 10/653* (2014.01)
 *H01M 10/613* (2014.01)
 *H01M 10/6554* (2014.01)
 *H01M 50/204* (2021.01)
(52) U.S. Cl.
 CPC ....... *H01M 10/653* (2015.04); *H01M 10/613* (2015.04); *H01M 10/6554* (2015.04); *H01M 50/204* (2021.01)

(58) Field of Classification Search
 CPC ............ H01M 10/653; H01M 10/613; H01M 10/6554; H01M 50/204
 USPC ....................................................... 429/120
 See application file for complete search history.

(56) References Cited

U.S. PATENT DOCUMENTS

| 11,245,151 | B2 | 2/2022 | Kim | |
| 2020/0373532 | A1 | 11/2020 | Gormanns | |
| 2022/0102798 | A1* | 3/2022 | Son et al. | ........... H01M 50/148 |

OTHER PUBLICATIONS

The Office Action issued by the Indian Patent Office on Sep. 30, 2024.

* cited by examiner

*Primary Examiner* — Kevin P Kerns
(74) *Attorney, Agent, or Firm* — Harvest IP Law, LLP

(57) ABSTRACT

A battery pack cooling structure includes a battery module having a structure in which a plurality of battery cells are electrically connected and are accommodated in a case, and a battery pack having a structure in which a plurality of battery modules are electrically connected to each other, wherein a gap filler made of a thermal conductive material is applied on a lower plate of the battery pack on which the plurality of battery modules are seated, and an upper portion of the lower plate cover of the lower plate is formed to be stepped from an edge portion of the lower plate in which the plurality of battery modules are installed toward a central portion of the lower plate in which relatively more of the plurality of battery modules are installed.

8 Claims, 5 Drawing Sheets

[Fig. 1]
Prior Art
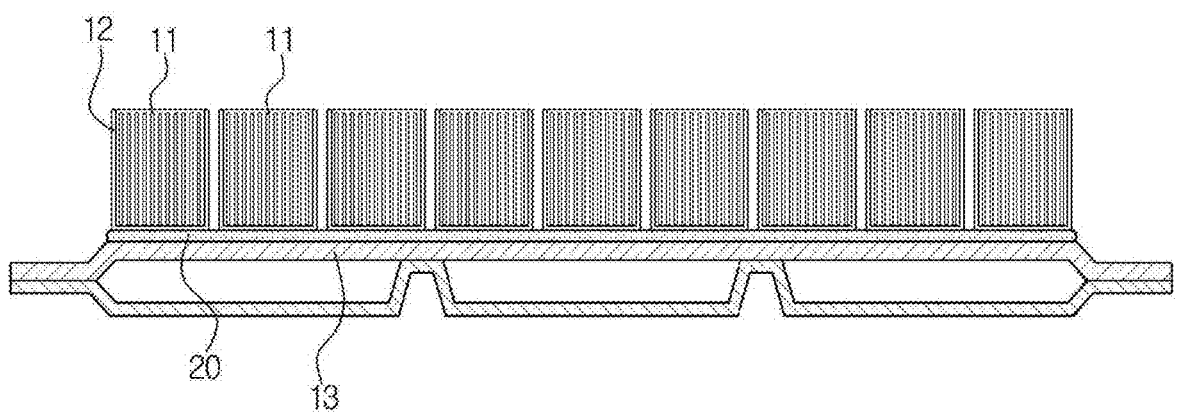

[Fig. 2]
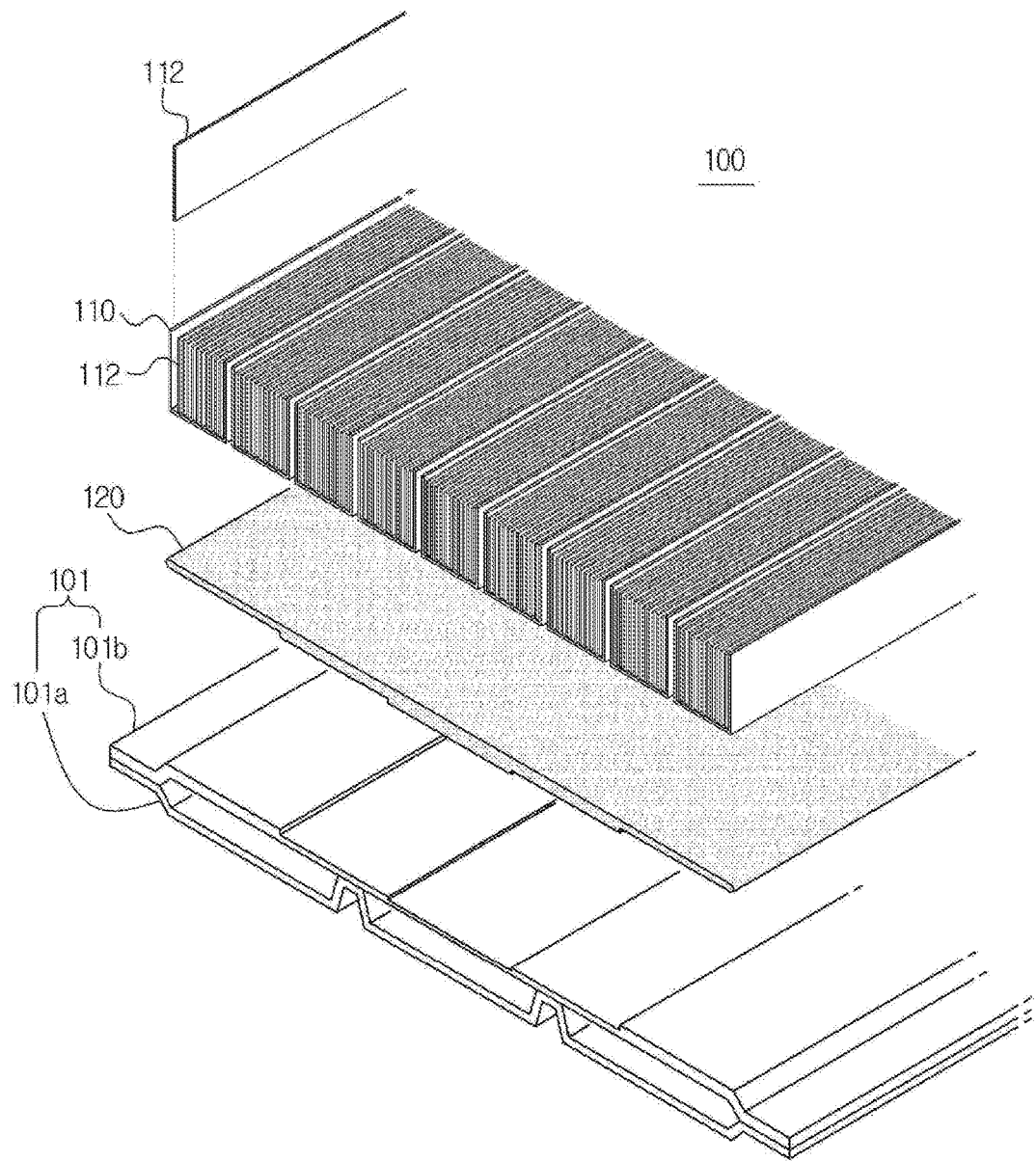

[Fig. 3]
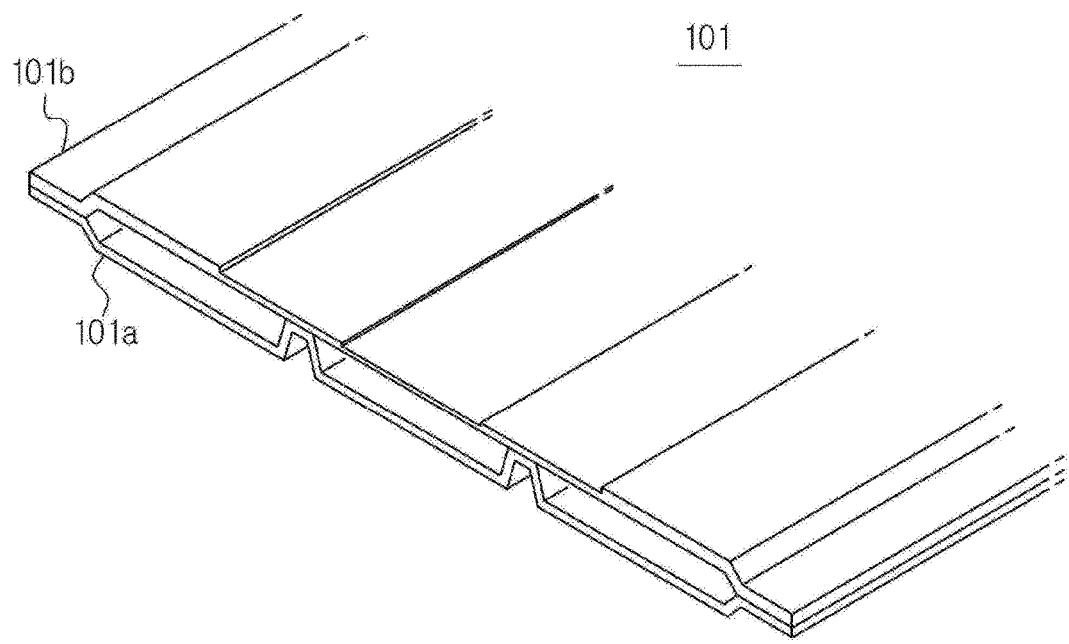

[Fig. 4]
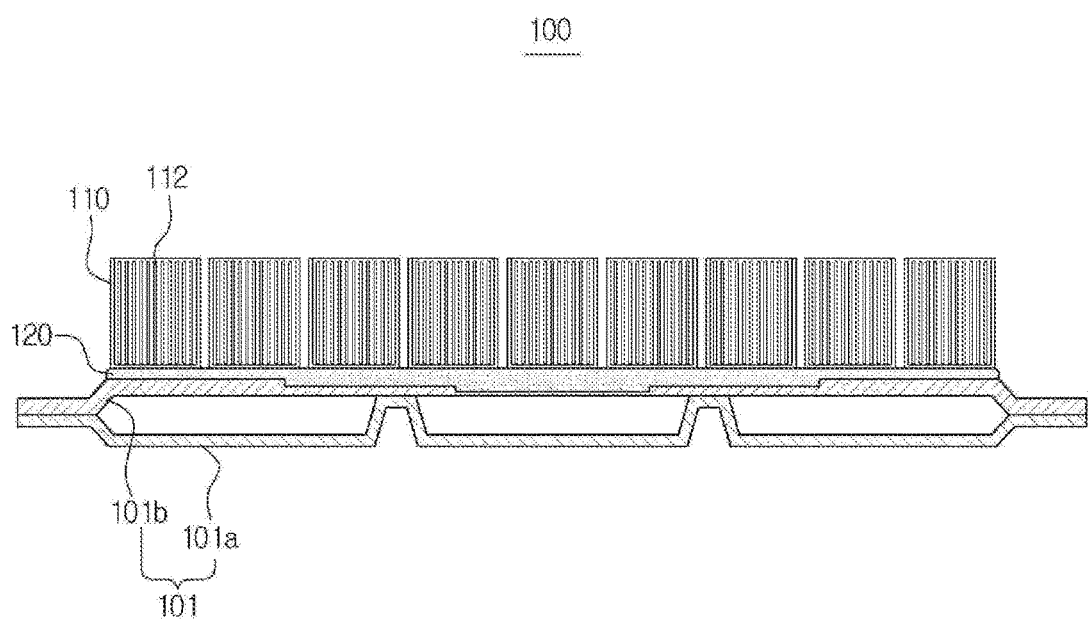

[Fig. 5]
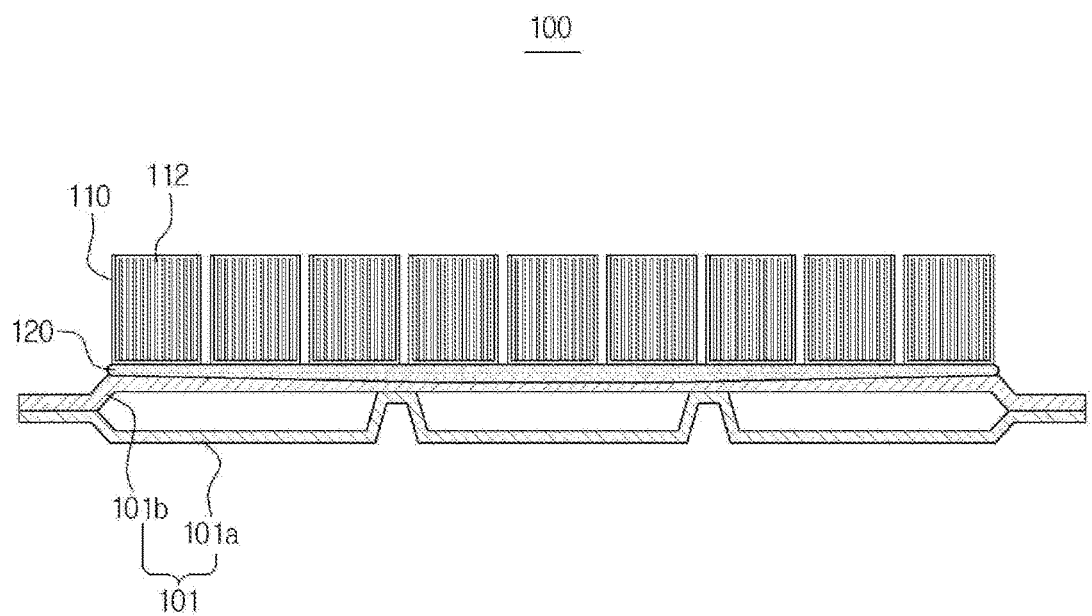

BATTERY PACK COOLING STRUCTURE THROUGH APPLYING VARIABLE THICKNESS OF GAP FILLER

CROSS-REFERENCE TO RELATED APPLICATION

This application claims priority to and the benefit of Korean Patent Application No. 10-2022-0020503 filed on Feb. 17, 2022, the disclosure of which is incorporated herein by reference in its entirety.

BACKGROUND

1. Field of the Invention

The present disclosure relates to a battery pack cooling structure, and more particularly, to a battery pack cooling structure through applying a variable thickness of a gap filler that may increase a lifetime of a battery pack by efficiently inducing thermal equilibrium in the battery pack.

2. Discussion of Related Art

In recent years, due to the improvement of air quality degraded by environmental pollution and depletion of fossil fuel energy resources, electric vehicles that minimize smoke and use electricity that is an eco-friendly energy have been spotlighted.

In general, the electric vehicles are equipped with a battery pack serving as an energy source. In this battery pack, a structure in which a plurality of secondary batteries (hereinafter, referred to as "battery cells") are electrically connected and then are accommodated in a case is called a battery module. In applications requiring higher output, a structure in which the plurality of battery modules are electrically connected to each other and are accommodated in the case is called a battery pack and is configured such that a current may flow when a motor is driven.

In order to constitute the battery pack, various fastening components, cooling devices, and the like are required. That is, the battery cell that is a basic unit constituting the battery pack when the motor of the electric vehicle is driven is quickly charged or discharged, the battery cell is vulnerable to heat as the charging or discharging is performed in succession and is thus damaged due to a degradation phenomenon of a surface of the battery cell, a swelling phenomenon in which the surface swells, and the like, and thus a cooling device that may solve this problem is required.

Thus, in the related art, cooling performance is improved by applying a gap filler made of a thermal conductive material to a lower plate of the battery pack on which the battery cell is seated so that the temperature inside the battery pack may be maintained at an appropriate temperature or the cooling performance is improved by removing or reducing components such as cartridges used for fixing and protecting the battery cell.

For example, in a process of implementing the battery pack, the gap filler is positioned between the battery modules and/or the battery modules and the case of the battery pack, and thus heat generated by the battery modules may be efficiently transferred to the case (the lower plate) of the battery pack.

However, in the conventional battery pack cooling structure using a gap filler 20 as described above, the heat generated by a battery module 12 may be transferred to a lower plate 13 of a case of a battery pack 10, but since thermal equilibrium is not achieved due to the occurrence of a temperature deviation between a portion in which a relatively high temperature occurs and a portion in which a relatively low temperature occurs, a battery cell 11 installed at the portion in which the relatively high temperature occurs swells and is damaged.

For example, as illustrated in FIG. 1, the thermal equilibrium is not achieved due to a temperature deviation between heat generated at a central portion of the battery pack 10 in which more of the battery modules 12 are intensively installed and heat generated at an edge of the battery pack 10 in which relatively fewer of the battery modules 12 are installed. Thus, a swelling phenomenon occurs on a surface of the battery cell 11 positioned at the central portion of the battery pack 10, and as a result, the lifetime of the battery pack 10 is reduced.

Thus, the present applicant has devised a battery pack cooling structure through applying a variable thickness of a gap filler to solve the problems of the related art as described above.

SUMMARY OF THE INVENTION

The present disclosure is directed to providing a battery pack cooling structure through applying a variable thickness of a gap filler, in which thermal equilibrium between a portion having a relatively high temperature and a portion having a low temperature is achieved by applying a step of a lower plate of a battery pack on which a battery module is seated and a variable thickness of a gap filler, and thus a temperature difference between battery cells can be reduced.

The present disclosure discloses a battery pack cooling structure through applying a variable thickness of a gap filler. According to an aspect of the present disclosure, there is provided a battery pack cooling structure including a plurality of battery modules having a structure in which a plurality of battery cells are electrically connected and are accommodated in a case, and a battery pack having a structure in which the plurality of battery modules are electrically connected to each other, wherein a gap filler made of a thermal conductive material is applied on a lower plate of the battery pack on which the plurality of battery modules are seated, and an upper portion of the lower plate cover of the lower plate is formed to be stepped from an edge portion of the lower plate in which the plurality of battery modules are installed toward a central portion of the lower plate in which relatively fewer of the plurality of battery modules are installed, and thus thermal equilibrium between a portion having a low temperature and a portion having a relatively high temperature can be induced.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is a schematic view illustrating a battery pack according to a related art;

FIG. 2 is a view for describing a battery pack cooling structure according to an embodiment of the present disclosure;

FIG. 3 is a schematic view illustrating a lower plate of the battery pack cooling structure according to the embodiment of the present disclosure;

FIG. 4 is a schematic view illustrating a cross section of the battery pack cooling structure according to the embodiment of the present disclosure; and FIG. 5 is a schematic view illustrating a modification of the battery pack cooling structure according to the embodiment of the present disclosure.

DETAILED DESCRIPTION OF EXEMPLARY EMBODIMENTS

Hereinafter, the present disclosure will be described in more detail with reference to the accompanying drawings.

Prior to this, terms or words used in the present specification and the appended claims should not be interpreted as being limited to usual or dictionary meanings and should be interpreted as meanings and concepts corresponding to the technical spirit of the present disclosure according to the principle that the inventor may properly define the concepts of the terms in order to describe his/her own disclosure in the best way.

Thus, since the embodiments described in the present specification and configurations illustrated in the drawings are merely the most exemplary embodiments of the present disclosure and do not represent all the technical spirit of the present disclosure, it should be understood that various equivalents and variations that may replace the embodiments and the configurations are present at filing of the present application.

FIG. 2 is a view for describing a battery pack cooling structure according to an embodiment of the present disclosure.

Referring to FIG. 2, the battery pack cooling structure according to the embodiment of the present disclosure includes a battery module 110 having a structure in which a plurality of battery cells 112 are electrically connected and are accommodated in a case and a battery pack 100 having a structure in which a plurality of battery modules 110 are electrically connected to each other and accommodated in the case, wherein a gap filler 120 made of a thermal conductive material is installed on a lower plate of the battery pack 100 on which the battery modules 110 are seated so that heat generated by the battery modules 110 can be effectively transferred.

Since the above configuration is the same as that of a battery pack structure according to the related art, a detailed description thereof will be omitted.

In the battery pack 100 having such a structure, heat is generated in the plurality of battery cells 112 inside the battery module 110, and the generated heat is cooled while transferred to a lower plate 101 of the battery pack 100 by the gap filler 120. In this case, the lower plate 101 of the battery pack 100 includes a lower plate base 101a having a hollow therein and a lower plate cover 101b that may cover an upper portion of the lower plate base 101a, wherein a coolant may flow through the hollow.

That is, the heat generated by the battery module 110 is transferred to the lower plate 101 through the gap filler 120 installed between the battery module 110 and the lower plate 101 of the battery pack 100, and the transferred heat is cooled by the coolant.

Here, the feature of the present disclosure is that the lower plate cover 101b of the lower plate 101 of the battery pack 100 positioned below the gap filler 120 is formed to be stepped so that thermal equilibrium between a portion having a relatively high temperature and a portion having a relatively low temperature can be induced to increase a lifetime of the battery.

That is, as illustrated in FIGS. 3 and 4, a thickness of the lower plate cover 101b is small at a central portion of the lower plate 101 at which more of the battery modules 110 are installed, the thickness of the lower plate cover 101b is large at an edge portion of the lower plate 101 at which relatively few of the battery modules 110 are installed, and thus the thermal equilibrium can be efficiently induced.

For example, inevitably, a slight temperature difference necessarily occurs between the portion at which more of the plurality of battery modules 110 are installed and the portion at which relatively few of the battery modules 110 are installed. Thus, a degradation phenomenon or a swelling phenomenon occurs in the battery modules 110 at the portion at which relatively more of the battery modules 110 are installed more quickly than the battery modules 110 at the portion at which fewer of the battery modules 110 are installed. Thus, the battery modules 110 having a relatively high temperature at the central portion may be frequently replaced.

However, in the battery pack cooling structure according to the embodiment of the present disclosure, the lower plate cover 101b is formed to be stepped from the edge portion at which relatively few of the battery modules 110 are installed toward the central portion at which more of the battery modules 110 are installed. Thus, heat exchange is relatively quickly performed in a thin central portion of the lower plate cover 101b, heat exchange is more slowly performed in a thick edge portion of the lower plate cover 101b than in the central portion, and thus the thermal equilibrium can be efficiently induced.

That is, through the coolant flowing through the hollow of the lower plate 101, the heat exchange is more quickly performed in the thin central portion of the lower plate cover 101b than in the thick edge portion of the lower plate cover 101b to achieve the thermal equilibrium. As a result, thermal circulation efficiency such as minimizing the temperature deviation between the central portion and the edge portion of the lower plate 101 is increased, and thus the lifetime of the battery pack 100 can be increased.

Thus, in the battery pack cooling structure according to the embodiment of the present disclosure, the thermal equilibrium is achieved by reducing the temperature deviation between the portion in which much heat is generated and the portion in which relatively little heat is generated by applying variable thicknesses of the step of the lower plate 101 of the battery pack 100 on which the battery module is seated and the gap filler 120 installed between the lower plate 101 and the battery module 110. Thus, the thermal circulation efficiency in the battery pack 100 is increased, and as a result, the lifetime of the battery can be increased.

Meanwhile, in the battery pack cooling structure according to the embodiment of the present disclosure, the lower plate is formed to be stepped in a stepwise manner, but the present disclosure is not limited thereto, and as illustrated in FIG. 5, the lower plate may be formed to be inclined downward from the edge portion toward the central portion.

That is, by forming an upper portion of the lower plate cover 101b of the lower plate 101 to be downward from the edge portion to the central portion, applying the gap filler 120 to the inclined upper portion, and thus increasing the thermal circulation efficiency, the thermal equilibrium of the battery module 110 is induced, and thus, an increase in the lifetime of the battery pack can be expected.

In a battery pack cooling structure according to an embodiment of the present disclosure, thermal equilibrium is achieved by reducing the temperature deviation between a portion in which much heat is generated and a portion in which relatively little heat is generated by applying variable thicknesses of a step of a lower plate of a battery pack on which a battery module is seated and a gap filler installed between the lower plate and the battery module. Thus, the thermal circulation efficiency in the battery pack is increased, and as a result, the lifetime of the battery can be increased.

Hereinabove, the spirit of the present disclosure should not be limited to the described embodiments, and not only the appended claims described below but also all those with equivalent to the claims or equivalent modifications from the claims belong to the scope of the spirit of the present disclosure.

What is claimed is:

1. A battery pack cooling structure comprising:
    a battery pack having a structure in which a plurality of battery modules are electrically connected to each other, the plurality of battery modules being positioned side by side in a horizontal direction, the plurality of battery modules including a first battery module at one side end and a second battery module at an opposite side end in the horizontal direction;
    each of the plurality to battery modules having a structure in which a plurality of battery cells are electrically connected and are accommodated in a case;
    a lower plate of the battery pack, the lower plate comprising a lower plate base and a lower plate cover covering the lower plate base; and
    a gap filler made of a thermal conductive material applied on the lower plate and positioned between the battery pack and the lower plate,
    wherein an upper surface of the lower plate cover is formed to be stepped down from the first and second side ends toward a center portion of the lower plate cover such that the upper surface of a first portion of the lower plate cover corresponding to the first battery module and the upper surface of a second portion of the lower plate cover corresponding to the second battery module have a higher height than the upper surface of a center portion of the lower plate cover.

2. The battery pack cooling structure according to claim 1,
    wherein the lower plate base has a hollow therein and the lower plate cover covers the hollow of the lower plate base,
    wherein a coolant flows through the hollow, and
    wherein the first and second portions of the lower plate cover corresponding to the first and second battery modules, respectively, are formed to be thicker than the center portion of the lower plate cover.

3. The battery pack cooling structure according to claim 2,
    wherein a lower surface of the gap filler is formed to be stepped down from the first and second side ends toward a center portion of the gap filler such that the lower surface of a first portion of the gap filler corresponding to the first battery module and the lower surface of a second portion of the gap filler corresponding to the second battery module have a higher height than the lower surface of the center portion of the gap filler.

4. The battery pack cooling structure according to claim 3,
    wherein a combined vertical thickness of the lower plate cover and the gap filler defined as a distance between a lower surface of the lower plate cover and an upper surface of the gap filler is constant from the first side end corresponding to the first battery module to the second side end corresponding to the second battery module, while vertical thicknesses of the lower plate cover and the gap filler change according to the upper surface of the lower plate cover and the lower surface of the gap filler being formed stepping down.

5. A battery pack cooling structure comprising:
    a battery pack having a structure in which a plurality of battery modules are electrically connected to each other, the plurality of battery modules being positioned side by side in a horizontal direction, the plurality of battery modules including a first battery module at one side end and a second battery module at an opposite side end in the horizontal direction;
    each of the plurality of battery modules having a structure in which a plurality of battery cells are electrically connected and are accommodated in a case;
    a lower plate of the battery pack, the lower plate comprising a lower plate base and a lower plate cover covering the lower plate base; and
    a gap filler made of a thermal conductive material applied on the lower plate and positioned between the battery pack and the lower plate,
    wherein an upper surface of the lower plate cover is inclined downward from the first and second side ends toward a center portion of the lower plate cover such that the upper surface of a first portion of the lower plate cover corresponding to the first battery module and the upper surface of a second portion of the lower plate cover corresponding to the second battery module have a higher height than the upper surface of the center portion of the lower plate cover.

6. The battery pack cooling structure according to claim 5,
    wherein the lower plate base has a hollow therein and the lower plate cover covers the hollow of the lower plate base,
    wherein a coolant flows through the hollow, and
    wherein the first and second portions of the lower plate cover corresponding to the first and second battery modules, respectively, are formed to be thicker than the center portion of the lower plate cover.

7. The battery pack cooling structure according to claim 6,
    wherein a lower surface of the gap filler is inclined downward from the first and second side ends toward a center portion of the gap filler such that the lower surface of a first portion of the gap filler corresponding to the first battery module and the lower surface of a second portion of the gap filler corresponding to the second battery module have a higher height than the lower surface of the center portion of the gap filler.

8. The battery pack cooling structure according to claim 7,
    wherein a combined vertical thickness of the lower plate cover and the gap filler defined as a distance between a lower surface of the lower plate cover and an upper surface of the gap filler is constant from the first side end corresponding to the first battery module to the second side end corresponding to the second battery module, while vertical thicknesses of the lower plate cover and the gap filler change according to the upper surface of the lower plate cover and the lower surface of the gap filler being inclined.

* * * * *